(12) United States Patent
Wang et al.

(10) Patent No.: US 7,196,711 B2
(45) Date of Patent: Mar. 27, 2007

(54) VIEW DEPENDENT DISPLACEMENT MAPPING

(75) Inventors: Lifeng Wang, Beijing (CN); Xi Wang, Beijing (CN); Xin Tong, Beijing (CN); Baining Guo, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 525 days.

(21) Appl. No.: 10/698,909

(22) Filed: Oct. 31, 2003

(65) Prior Publication Data

US 2005/0093857 A1 May 5, 2005

(51) Int. Cl.
*G09G 5/00* (2006.01)
(52) U.S. Cl. .................. 345/584; 345/426
(58) Field of Classification Search .............. None
See application file for complete search history.

(56) References Cited

OTHER PUBLICATIONS

Wang, L., Wang, X., Tong, X., Lin, S., Hu, S., Guo, B., Shum, H., View-Dependent Displacement Mapping, ACM Transactions on Graphics, vol. 22, Issue 3, Jul. 2003, pp. 334-339.*
Becker, B.G. and Max, N.L. 1993. "Smooth transitions between bump rendering algorithms" Computer Graphics (SIGGRAPH '93 Proceedings), 183-190.
Blinn, J.F. 1978. "Simulation of wrinkled surfaces" Computer Graphics (SIGGRAPH '78 Proceedings) 12, 3, 286-292.
Cook, R.L. 1984. "Shade trees" Computer Graphics (SIGGRAPH '84 Proceedings) 18, 1, 1-34.
Dana, K.J., Nayar, S.K., Van Ginneken, B., and Koenderink, J.J. 1999. "Reflectance and texture of real-world surfaces" ACM Transactions on Graphics 18, 1, 1-34.
Doggett, M., and Hirche, J. 2000. Adaptive view dependent tessellation of dispalcement maps. Eurographics Workshop on Graphics Hardware, 55-66.
Gumhold, S., and Huttnert, T. 1999. "Multiresolution rendering with displacement mapping" Eurographics Workshop on Graphics Hardware, 59-66.
Heidrich, W., Daubert, K. Kautz, J., and Seidel, H.P. 2000. "Illuminating micro geometry based on precomputed visibility" Computer Graphics (SIGGRAPH '00 Proceedings), 455-464.
Kautz, J. and Seidel, H.P. 2001. "Hardware accelerated displacement mapping for image based rendering" Graphics Interface, 61-70.
Koenderink, J.J. and Doorn, A.J.V. 1996. "Illuminance texture due to surface mesostructure" Journal of the Optical Society of America 13, 3, 452-463.
Lensch, H.P.A, Daubert, K. and Seidel, H.P. 2002. "Interactive semitransparent volumetric textures" Proc. Vision, Modeling and Visualization, 505-512.

(Continued)

*Primary Examiner*—Ulka Chauhan
*Assistant Examiner*—Said Broome
(74) *Attorney, Agent, or Firm*—Todd R. Fronek; Westman, Champlin & Kelly P.A.

(57) ABSTRACT

A computer implemented method for generating a representation of structure for use in rendering a synthesized image is provided. The representation is a view-dependent displacement mapping that represents displacements along a viewing direction. This view dependency allows the representation to be used to determine self shadows as well as shading, occlusion and silhouettes when used during rendering for synthesis.

26 Claims, 6 Drawing Sheets

OTHER PUBLICATIONS

Malzbender, T., Gelb, D., and Wolters, H. 2001. "Polynomial texture maps" Computer Graphics (SIGGRAPH '01 Proceedings) (August).

Max, N. 1988. "Horizon mapping: shadows for bump-mapped surfaces" The Visual Computer 4, 2, 109-117.

Meyer, A., and Neyret, F. 1998. "Interactive volumetric textures" Eurographics Workshop on Rendering, 157-168.

Oliveira, M.M., Bishop, G. and McAllister, D. 2000. "Relief texture mapping" Computer Graphics (SIGGRAPH '00 Proceedings), 359-368.

Patterson, J.W., Hoggar, S.G., and Logie, J.R. 1991. "Inverse displacement mapping" Computer Graphics Forum 10, 2, 129-139.

Pharr, M. and Hanrahan, P. 1996. "Geometry caching for ray-tracing displacement maps" Eurographics Workshop on Rendering, 31-40.

Schaufler, G. and Priglinger, M. 1999. "Efficient displacement mapping by image warping" Eurographics Workshop on Rendering, 175-186.

Sloan, P.P. and Cohel, M.F. 2000. "Interactive horizon mapping" Eurographics Workshop on Rendering (June) 281-286.

Smits, B., Shirley, P. and Stark, M.M. 2000. "Direct ray tracing of displacement mapped triangles" Eurographics Workshop on Render, 307-318.

Cook, R.L., Carpenter, L. and Catmull, E. 1987. "The reyes image rendering architecture" Computer Graphics (SIGGRAPH '87 Proceedings) 95-102.

\* cited by examiner

VIEW DEPENDENT DISPLACEMENT MAPPING

BACKGROUND OF THE INVENTION

The present invention relates to computer generated graphics, in particular, the modeling and rendering of realistic graphics, focusing on fine-scale geometric features and associated visual effects of such features.

Computer graphics are used in many different applications including computer games, movies and web pages. With the capability of more powerful computers, realistic graphics are becoming more desired in order to provide a more realistic experience to the computer user.

Accurate computer rendering of fine-scale geometric features and associated visual effects yields vivid object appearance. This level of detail, commonly referred to as mesostructure, lies between that of meshes, which provide an efficient representation of gross shape, and bi-directional reflectance functions (BRDFs) that describe the light scattering effects of micro-scale material structure. The high-frequency visible geometry of mesostructure leads to complex visual effects including fine-scale shadowing, occlusion and silhouettes. These characteristics each contribute to realistic appearance, but are also difficult to render efficiently.

Mesostructures are typically rendered using techniques such as, bump mapping, horizon mapping or displacement mapping. In summary, bump mapping perturbs mesh normals to coincide with the geometric detail to provide basic shading but not shadowing, occlusion, and silhouettes. Horizon mapping improves realism by adding self-shadows, but occlusion and silhouettes are still missing. Displacement mapping lacks shadowing, but provides occlusion and silhouettes. In addition, although conventional displacement mapping can be implemented in hardware, its performance for mesostructure rendering is limited by the large number of vertices that result from the considerable mesh subdivision required.

An image-based approach to mesostructure rendering is to sample surface appearance under various lighting and viewing directions. This technique is commonly referred to as a bi-directional texture function ("BTF"). Although characteristics such as shading, self-shadowing and occlusion are realized, silhouette characteristics are lacking. Simimarly, a polynomial texture map ("PTM") can incorporate shading and self-shadowing attributes, but lacks occlusion and silhouettes.

Accordingly, there, is a clear need for improvements in realistic, mesostructure computer-renderings. Although a new method and system to render mesostructures with shadowing, occlusion and silhouette attributes would by itself be beneficial, an algorithm realizing some or all of these features that can be quickly and/or efficiently employed would also be beneficial.

SUMMARY OF THE INVENTION

One aspect of the present invention includes a computer implemented method for generating a representation of structure for use in rendering a synthesized image is provided. The representation is a view-dependent displacement mapping that represents displacements along a viewing direction.

The view-displacement representation records a distance of each point on the structure from a reference surface along a viewing direction. For a given viewing direction $V=(\theta, \Phi)$, (being a function of at least one angle with respect to the reference surface, which can be expressed in spherical coordinates) each reference surface point P with a corresponding texture coordinate (x, y) in the map projects to a mesostructure surface point P' that has texture coordinate (x', y'). For different viewing directions V, P projects onto different points on the structure surface. The view-dependent displacement representation can be organized into a five-dimensional function when a local reference surface curvature along the viewing direction is included.

Another aspect of the invention includes using the representation for synthesis. The representation is particularly advantageous because it can be used to determine self shadows as well as shading, occlusion and silhouettes in the synthesized image.

DETAILED DESCRIPTION OF ILLUSTRATIVE EMBODIMENTS

Figure 1:
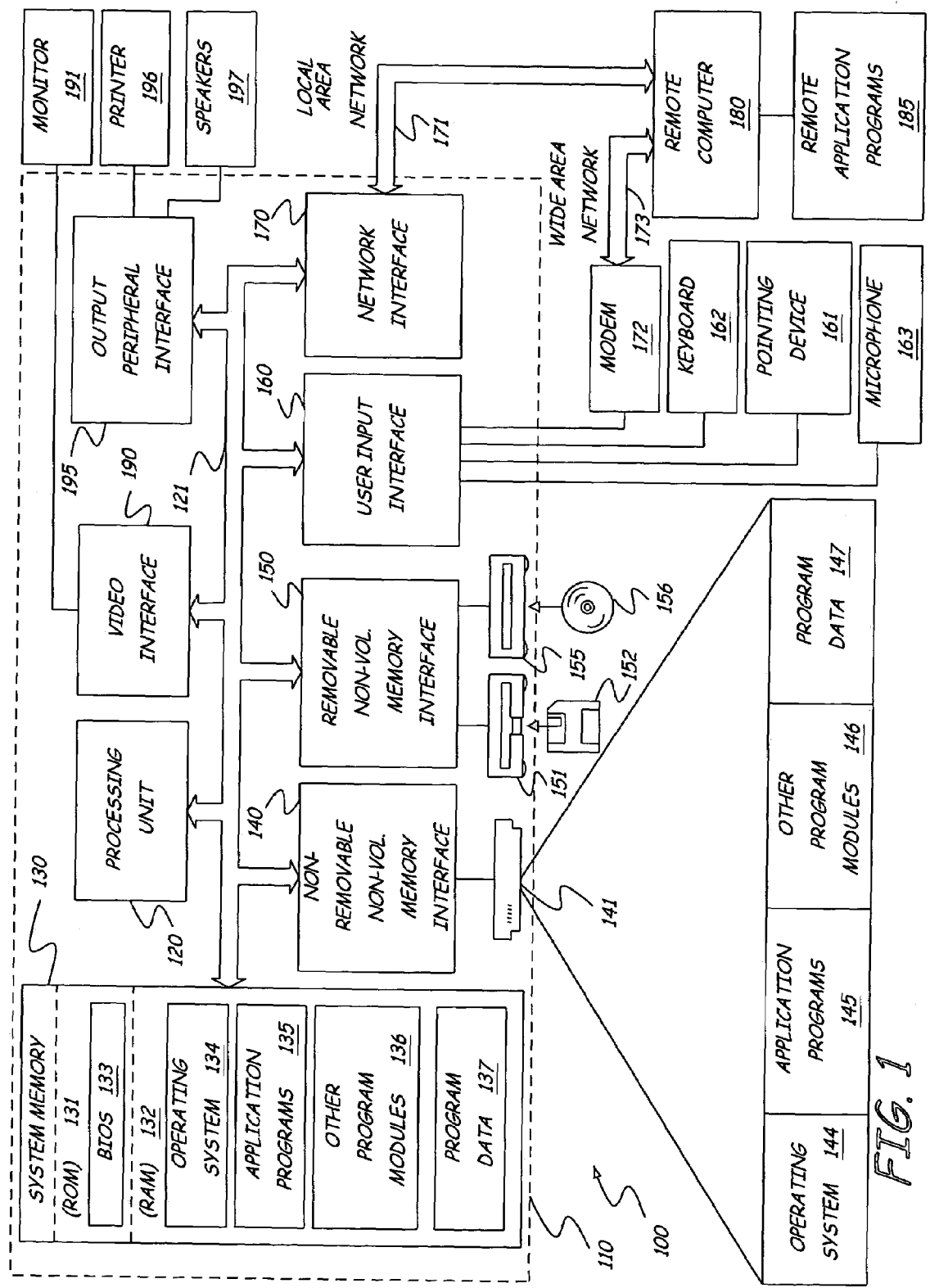
FIG. 1 is a block diagram of an exemplary computing environment for practicing the present invention.

Prior to discussing the present invention in greater detail, an embodiment of an illustrative environment in which the present invention can be used will be discussed. FIG. 1 illustrates an example of a suitable computing system environment 100 on which the invention may be implemented. The computing system environment 100 is only one example of a suitable computing environment and is not intended to suggest any, limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory, 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards. Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks: (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way, of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110, may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the, exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage, device. By way of example, and not limitation, FIG. 1 illustrates remote application programs 185 as residing on remote computer 180. It will be appreciated that the network connections shown are exemplary and other means of establishing a communications link between the computers may be used.

Figure 2:
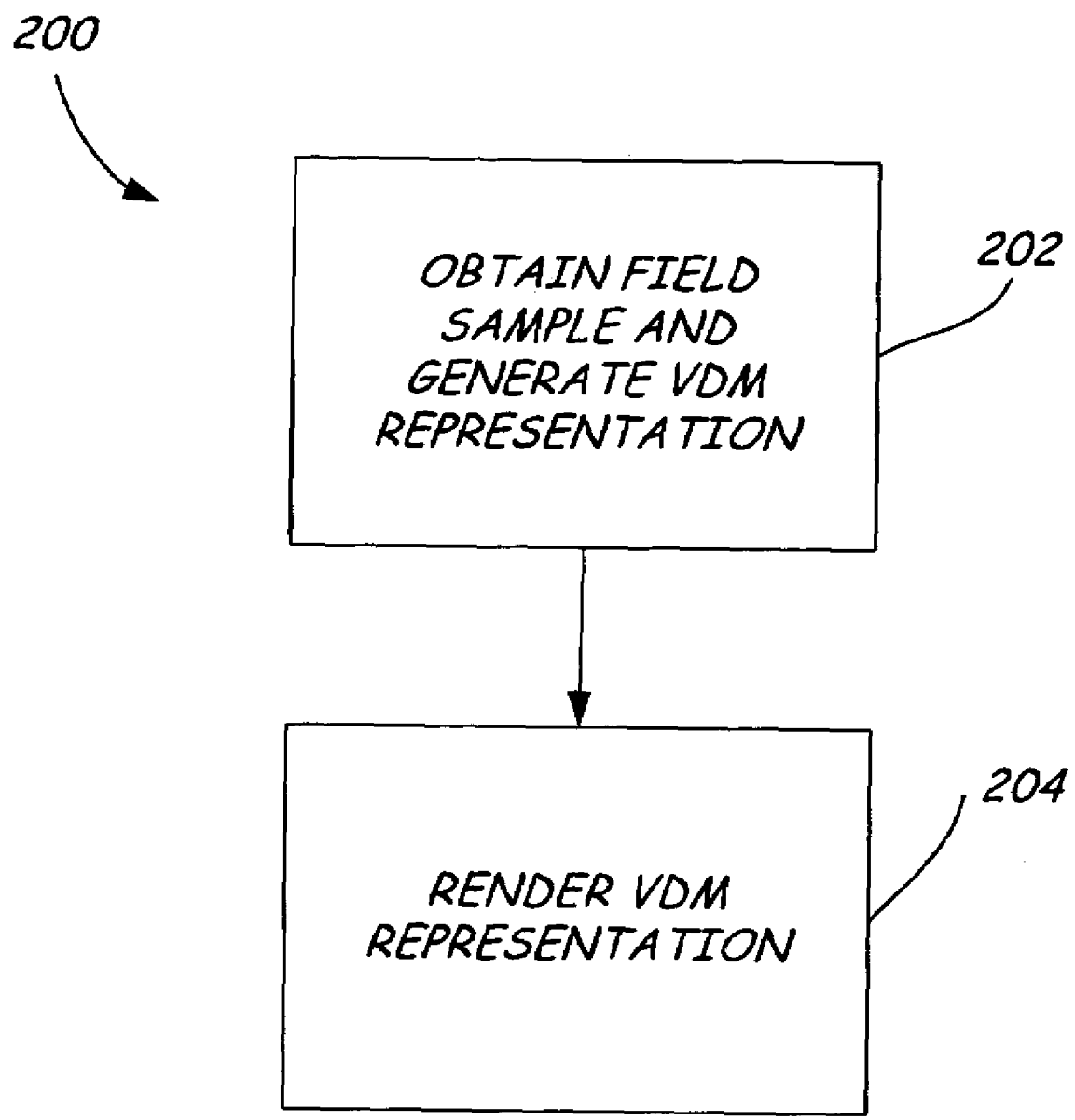
FIG. 2 is a flowchart illustrating a method for obtaining and using a view-dependent displacement representation.

In general, an aspect of the present invention comprising a method of structure rendering is illustrated in FIG. 2 at, 200 and includes two general steps 202 and 204. At step 202, a textured height field sample or distribution is accessed and converted to a view-dependent mapping ("VDM") or representation. At step 204, the VDM representation is used for rendering such as by a per-pixel algorithm that can be implemented in hardware. Details regarding these steps are provided below.

Figure 3:
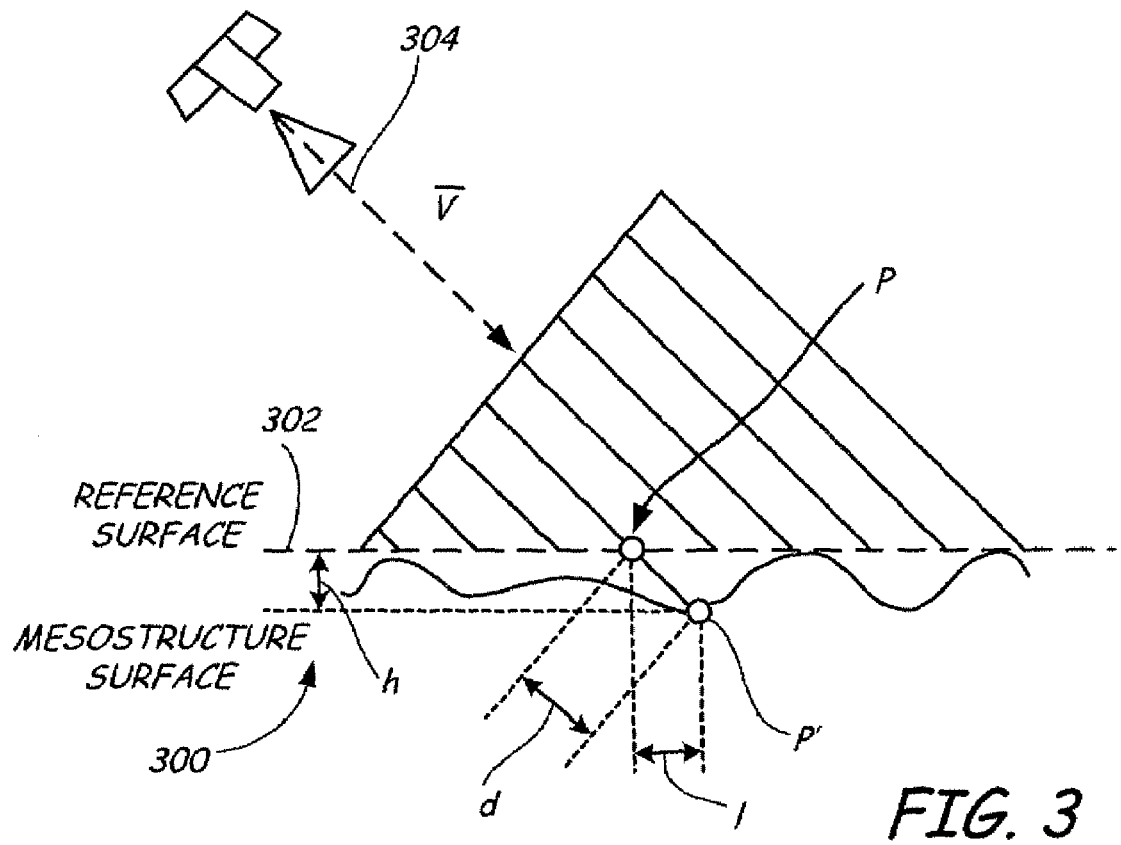
FIGS. 3, 5–7 are schematic sectional views of mesostructure surfaces.
Figure 4:
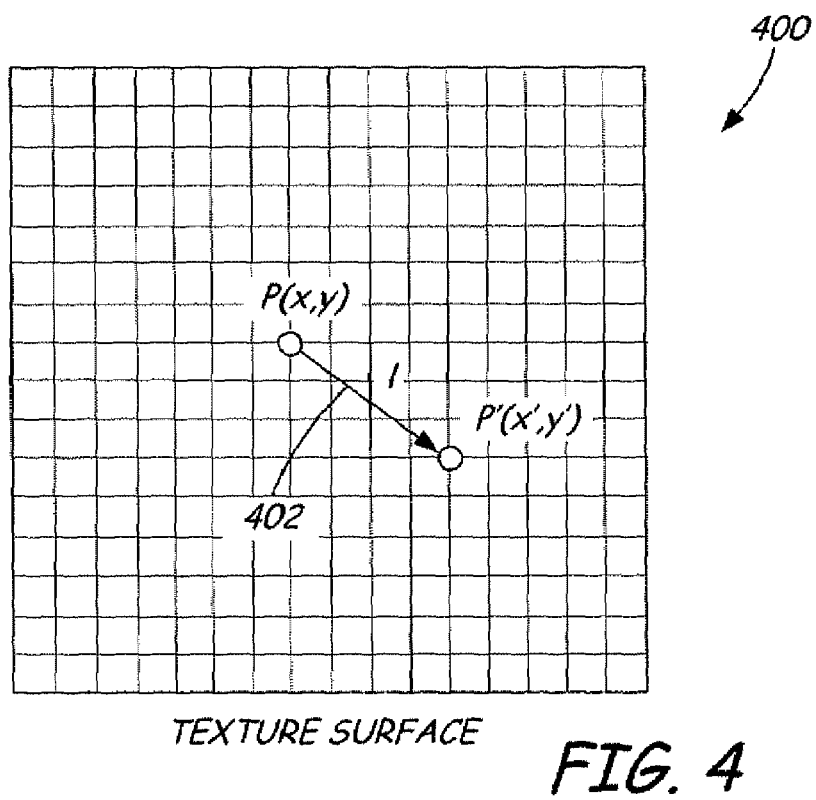
FIG. 4 is pictorial representation of texture space.

Aspects of step 202 are illustrated in FIG. 3. A textured height field sample or distribution (herein also "mesostructure") is indicated at 300. A reference surface 302 is used to create a view-dependent displacement map 400 illustrated in FIG. 4. The view-displacement map or representation 400 records a distance 402 of each point on the mesostructure 300 from the reference surface 302 along a viewing direction 304, as illustrated in FIG. 3. For a given viewing direction 304 V=($\theta$, $\Phi$), (being a function of at least one angle with respect to the reference surface 302, which can be expressed in spherical coordinates) each reference surface point P with a corresponding texture coordinate (x, y) in map 400 projects to a mesostructure surface point P' that has texture coordinate (x', y'). It should be noted, for different viewing directions V, P clearly would project onto different points on mesostructure surface 300, so a displacement value d (herein along or substantially parallel to the viewing direction V) is dependent on $\chi$, y, $\theta$, $\phi$. Generally, d is but one view-dependent displacement parameter that can be used, other parameters that are also a function of viewing directions such as h or l could equivalently be used to represent a view-displacement parameter; however, d is less affected by sampling errors that would arise at viewing directions close to a surface normal or tangent of the reference surface 302.

Figure 5:
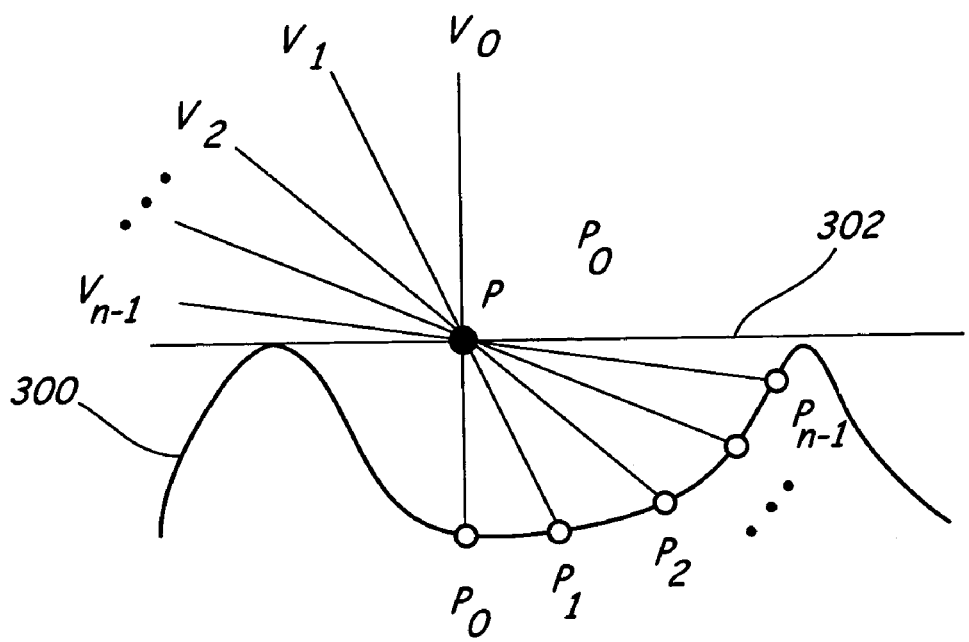

The foregoing provides an illustrative example where the mesostructure 300 is generally planar; however, in many instances a local curvature of the mesostructure 300, which can also be a mesh surface, also affects the projection points $P_0'$, $P_1'$, $P_2'$ ... $P_{n-1}'$ for different view directions $V_0$, $V_1$, $V_2$ ... $V_{n-1}$. When displacements for a flat reference surface 302 as illustrated in FIG. 5 are mapped onto a curved surface 602 as FIG. 6, the displacements d (P to P') are, no longer correct, and for some viewing directions such as $V_{n-1}$ there does not even exist an intersection with the mesostructure surface 300. Curvature is generally ignored in other rendering algorithms such as bump mapping, horizon mapping, BTF and PTM. However, neglect of this factor can lead to inaccurate silhouettes and a warped appearance of the mesostructure.

Figure 6:
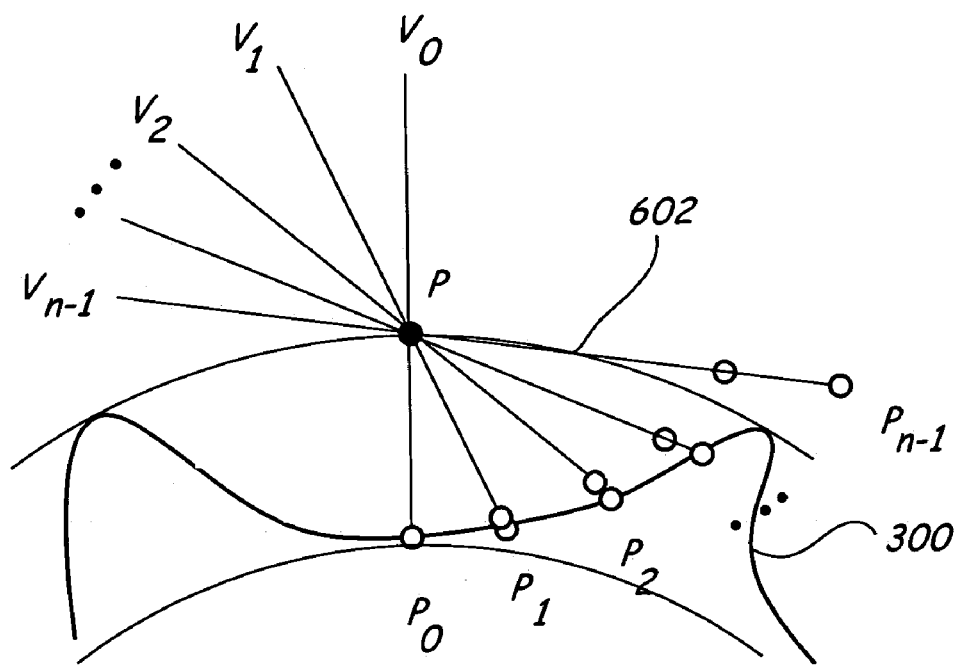

With the consideration of curvature, view-dependent displacement information can be organized into a five-dimensional VDM function $d_{VDM}(\chi, y, \theta, \phi, c)$, where x, y are the texture coordinates for P on the reference surface (FIG. 4), $\theta, \phi$ are the spherical angles of the viewing direction in the local coordinate frame on the reference surface 602, and c is the local reference surface curvature along the viewing direction. Stated another way, FIG. 6 is a sectional view taken along a plane defined by a viewing direction (here $V_0$, $V_1, V_2 \ldots V_{n-1}$ lie in the same plane) and the surface normal at P. This plane will intersect the reference surface 602 along a curve, where c is the curvature of this curve at P.

Figure 7:
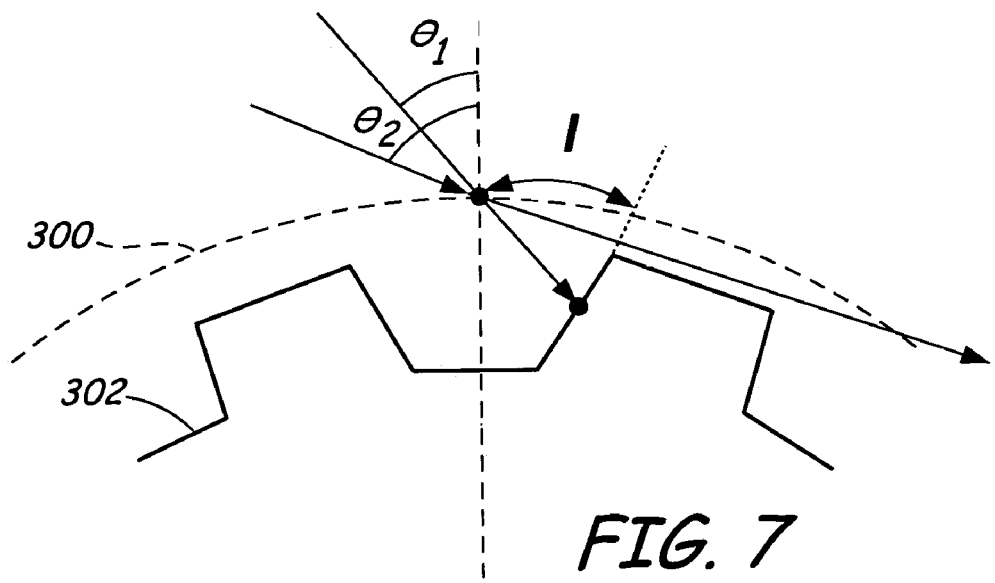

If an intersection with the mesostructure 300 exists for (x, y) in direction $\theta,\phi$ with curvature c, then the VDM function takes a value (finite distance) of the view-dependent displacement $d_{VDM}$. If the intersection does not exist, or stated another way, no finite distance exists between the reference surface 302 and the mesostructure 300, then $d_{VDM}$ is set to −1. FIG. 7 illustrates the foregoing where for $\theta_1$, $d_{VDM}$ equals l/sin $\theta_1$, while for $\theta_2$, $d_{VDM}$ equals −1. In the present implementation, the mesostructure surface 300 is defined inwards of the reference surface 602, so negative displacements are invalid.

In one embodiment, the view-dependent mesostructure function is built by first forming a fine mesh for a mesostructure with zero curvature, and then using a ray-casting algorithm the view-dependent displacement values are calculated.

While it is possible to compute the full 5D (five dimensional) view-dependent mesostructure function by forming a mesostructure mesh for various curvature values, in one embodiment, a less computationally expensive approach is used based on the zero-curvature mesostructure mesh.

For ease of explanation, consider a given point $(x_0, y_0)$ and azimuth angle $\phi_0$ of the viewing direction and that there are n sampled viewing elevation angles $(\theta_0, \theta_1, \ldots, \theta_{n-1})$ uniformly distributed over $(0, \Pi/2)$ and intersecting the microgeometry at points $P_0, P_1, \ldots, P_{n-1}$, as shown in FIG. 5. The displacements of these points are used to compute the zero curvature values of the VDM, and can also be used for calculations of other curvatures.

Bending the zero-curvature microgeometry surface to have curvature $C=C_0$ causes the zero-curvature intersection points to correspond to new viewing angles $(\theta_0', \theta_1', \ldots, \theta_{n-1}')$ that are no longer a uniform sampling. To obtain the VDM values, the non-uniform samples are resampled by linear interpolation.

In the resampling process, a couple special cases require attention. When the curvature is positive, some view-dependent displacement values may become invalid because no intersection with the mesostructure surface exists, or stated another way, no finite distance exists between the reference surface 302 and the mesostructure 300. In this instance, the VDM is assigned a value of −1, as indicated above. Another special case occurs when the sampled angles become reordered after resampling. This happens when a zero-curvature intersection point becomes occluded after bending. For this case, the occluded direction is discarded in the resampling operation.

To efficiently compute the texture offset for a curved surface at rendering time, the VDM definition $d_{VDM}(\chi, y, \theta_v, \phi_v, c_v)$ equals l/sin $\theta_v$ is used, where l is the distance between P and P' in texture space and can be geometrically computed from the triangle defined by P, P' and the center of curvature. This extended definition simplifies texture offset computation for curved surfaces as described above.

After computing a VDM representation for a given mesostructure surface at step 202 in FIG. 2, it can be mapped to a new surface as a high-dimensional texture at step 204. This mapping should result in texture coordinates on the object surface that have locally uniform scale and little distortion, with the mesostructure pattern closely maintained. Since the mesostructure is typically a three-dimensional volume, it is also preferred that its dimensions be scaled equally in the mapping.

Several property maps such as normal and color maps may be generated and accessed for rendering. Since all of the maps are defined on the same reference surface, they can be applied onto the surface of a new object simultaneously. After, mapping, one can imagine that the height field or distribution is extended under the object surface with locally uniform scale and little distortion.

To render the VDM representation or mapping, the normals of the object surface are calculated from the height field. Each surface normal and the two orthogonal directions of the texture define a local coordinate system in which the viewing and lighting directions are expressed.

The parameters of each pixel on, for example, a rasterized, surface are then computed. The parameters can include a texture coordinate T=(x, y), an illumination direction $L=(\theta_L, \phi_L)$, a viewing, direction $V=(\theta_V, \phi_V)$ and local curvatures $c_V$, $c_L$ along V and L respectively. From the two principal curvature directions $C_{max}$, $C_{min}$ and their corresponding curvature values, $C_{max}$, $C_{min}$, the curvature along the viewing direction V can be computed as $$C_V = \frac{c_{max}(V \cdot C_{max})^2 + c_{min}(V \cdot C_{min})^2}{1 - (V \cdot N)^2}$$

The curvature $c_L$ along the lighting direction L is computed similarly. Although the parameters of each pixel can be calculated in this manner, in one embodiment to reduce computations, the parameters for pixels of vertexes of the object surface are calculated with interpolation used to find the values of parameters of the remaining pixels.

Figure 8:
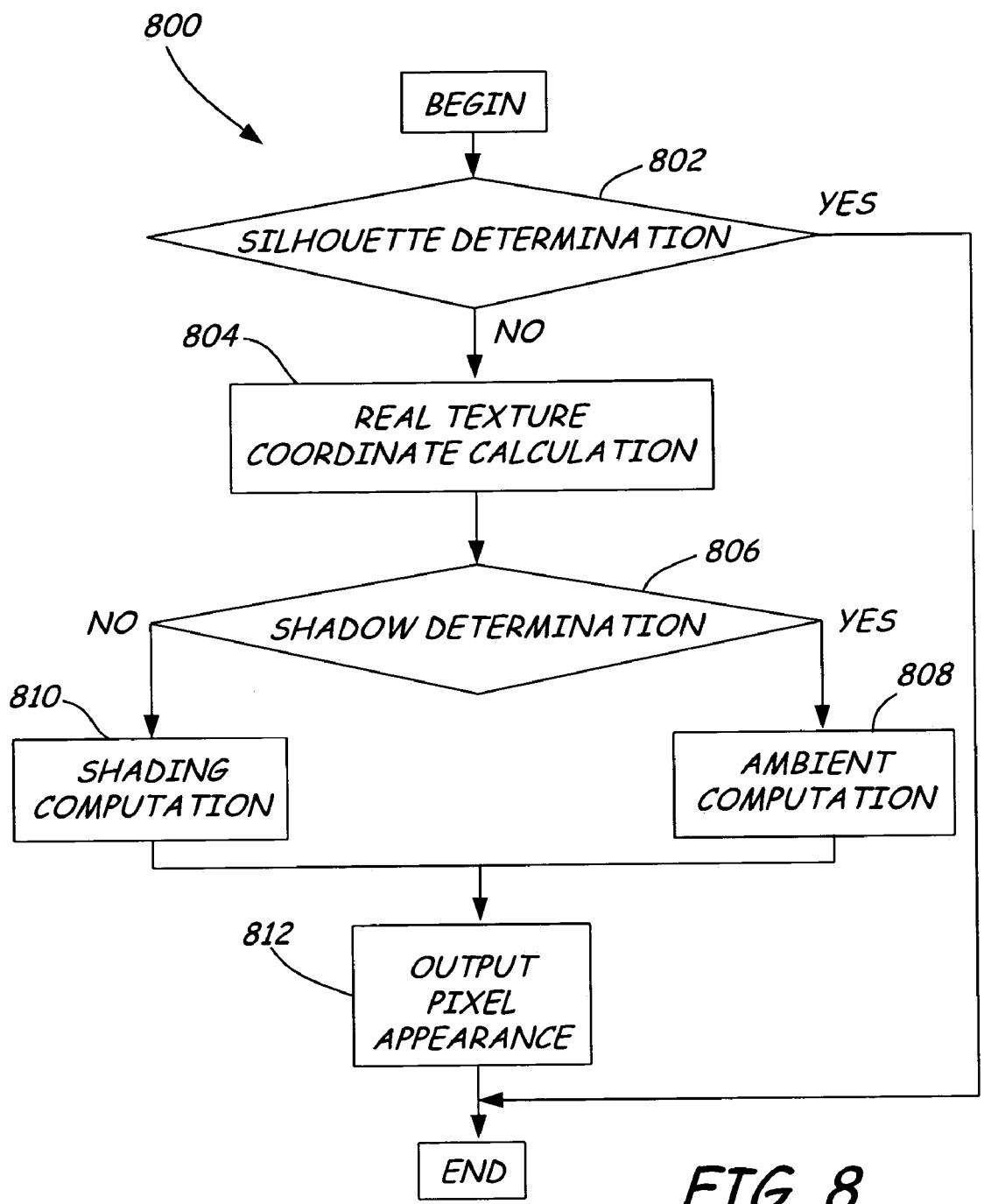
FIG. 8 is a flow chart of a method for processing a view-dependent displacement representation.

After calculating the pixel parameters, VDM rendering of detailed geometry proceeds with method 800 of FIG. 8.

Method 800, for each pixel, begins with step 802 whereat a silhouette determination is made. The VDM function includes an explicit representation of point visibility along the mesostructure silhouette. As explained, above, when $d_{vdm}=-1$, then the corresponding line of sight intersects no detailed geometry. In this case, the corresponding pixel need not be processed and the rest of the algorithm as illustrated in FIG. 8 is skipped. However, if the $d_{vdm}$ value is not −1, the corresponding viewing direction ray would intersect with an underlying height field P' such as illustrated in FIG. 10. In one embodiment, for each pixel the nearest sample value in texture space is used for silhouette determination.

At step 804, a real texture coordinate for the pixel is calculated in order to obtain shading parameters stored in property maps. In particular, since properties of the detailed geometry are parameterized by texture coordinates on the planar reference or sample surface, the actual texture coordinate of each mesostructure intersection point needs to be determined. In other words, the offset of P' from P in the texture space needs to be calculated.

For a planar reference surface, the offset between the real texture coordinate T' and original texture coordinates T=(x, y) can, be computed as $dT=d_{VDM}(x, y, \theta_V, \phi_V, C_V)V_{xy}$, where $V_{xy}=(\sin\theta_V \cos\phi_V, \sin\theta_V \sin\theta_V)$ is the projection of the viewing vector onto the local tangent plane. For a curved reference surface, the texture offset can be computed in the same way from the extended VDM displacement for curved surfaces as described above.

The real texture coordinate T' is then obtained by adding this offset to the original texture coordinate T, i.e., T'=T+dT.

Figure 9:
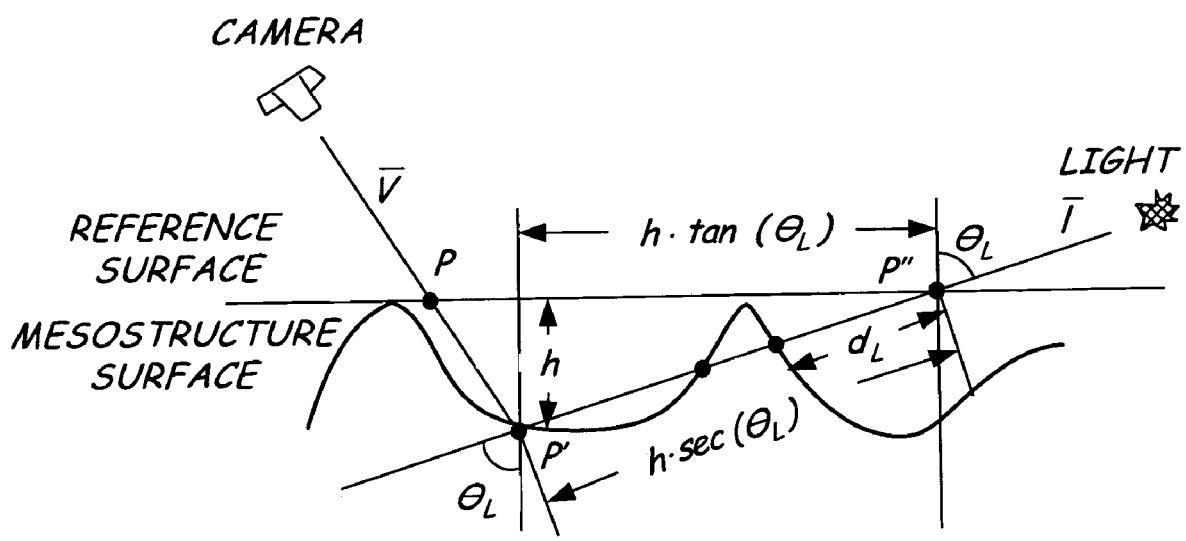
FIG. 9 is a schematic sectional view illustrating aspects for rendering a mesostructure surface.

At step 806 shadowing or occlusion is determined for each pixel by the height field. Shadowing of the intersection point from the light source can be determined from the VDM representation. To better explain this step, a discussion will first be provided for a flat reference surface 900 as illustrated in FIG. 9. Let P be the mesh surface point and P' be the intersection point on the detailed geometry. Let h denote the distance from p' to the surface as given by the mesostructure height field. The point P'' represents the reference surface intersection of L passing through P'.

Since the reference surface 900 is flat, the texture coordinate of P'' can be geometrically determined as T=T+h·tan$(\theta_L)$·L. The view-dependent displacement of P'''=(x'', y'') along is given by $d_L=d_{VDM}(x'', y'', \theta_L, \phi_L, 0)$.

The distance h·sec$(\theta_L)$ between P' and P'' is compared to $d_L$ to determine the presence of shadow. When the two quantities are equal, P' is in lighting or the light source is not occluded from P'; otherwise, P''' is in shadow.

For a curved object surface, the computation of T requires solving some trigonometric equations. To reduce run-time computation, a table indexed by the variables h, $\theta_L$ and $c_L$ could be built. However, the effect of curvature on shadow determination is generally unnoticeable, so it can be ignored.

Depending on whether or not the pixel is in shadow, shading is provided. In particular, if the pixel P' is in shadow, method flow proceeds to block 808 whereat an ambient color is used, based typically on normal and material property maps defined on the same reference surface. If on the other hand, pixel P' is not in shadow, the pixel color can be computed at step 810 using a pre-defined reflectance model or other suitable technique.

In FIG. 8, the output appearance of each pixel based on the foregoing steps is quantified at step 812.

Having described obtaining a VDM representation and using the same for rendering, it may be helpful to consider implementation on a form of graphics hardware. In particular, the rapid development of programmable graphics, hardware provides opportunities for real-time implementations of the VDM rendering algorithm. However, for some forms of hardware some constraints may need to be overcome, examples of which are provided below. Nevertheless, it should be understood that implementation of the VDM rendering algorithm or method described above, or the VDM representation, is not intended to be limited to the discussion provided below.

For some hardware platforms, the maximum dimensionality of texture maps can pose a problem for high-dimensional maps such as VDM. In addition, memory constraints can present an obstacle to the substantial amount of data in the VDM representation. For instance, mesostructure height fields of resolution 128×128 with 32×8 viewing directions and 16 curvatures can be obtained. The corresponding 64 MB of VDM data required may exceed some hardware memory limits and thus cannot efficiently be loaded.

To deal with restrictions such as these, the data can be decomposed and compressed by singular-value decomposition (SVD). SVD has the benefit that it can efficiently decompose a high-dimensional map into two lower-dimensional maps. Moreover, reconstruction is performed using only linear arithmetic operations, which can easily be handled in the hardware. For data with high correlation, a small number of eigen-functions is sufficient for good reconstruction.

As described above in the VDM representation, when a ray along a view direction has no intersection with the mesostructure, it is labeled with the special value, herein exemplified as −1. When the silhouette exhibits high frequency, the number of eigen functions needed for acceptable reconstruction is dramatically increased, which can lead to difficulties in hardware implementation.

To address this problem, an auxiliary 4D Maximal View polar angle Map (MVM) is used. The MVM records the boundary polar angle $\theta_{MAX}$ for each position. For a densely sampled VDM, the MVM $\theta_{MVM}$(x, y, $\phi$, C)≡max $\theta$ such that $$d_{VDM}(\chi, y, \theta, \phi, C) \neq -1,$$

where x, y are texture coordinates, $\phi$ is the azimuth angle of the viewing direction, and c is the local curvature. After this computation, the −1 value of the corresponding polar viewing angle in the original VDM is in effect replaced with the distance for this maximum polar viewing angle. For some mesostructure samples by way of example, the MVM size is 4 MB, and combined with the VDM data, the total data size becomes 68 MB.

The high-dimensional VDM and MVM are then reorganized into a 2D matrix $$A = [A_{VDM}, A_{MVM}]$$

such that the rows are indexed by $\chi,y,\phi$ and the columns are indexed by $\phi$ and/or c. Although these maps could be differently organized for decomposition, experiments have shown that this solution can provide a good compromise between accuracy and storage.

Applying SVD to A gives $A = U\lambda E^T = WE^T$, where $E=[E_{VDM}, E_{MVM}]$ contains the eigen functions of A and $W=U\lambda$ contains the weights of the eigen functions. From this, the two maps can be expressed as $$d_{VDM}(\chi, y, \theta, \phi, c) = \sum_i W^i(\chi, y, \phi) E^i_{VDM}(\phi, c)$$

$$d_{MVM}(\chi, y, \theta, \phi, c) = \sum_i W^i(\chi, y, \phi) E^i_{MVM}(c)$$

where i indexes the eigen functions in E and the eigen function weights in W. Note that a common weight function is used for the two maps to reduce storage.

Since the eigen values decrease rapidly in magnitude, good rendering accuracy can be achieved with a small number of eigen functions. For example, only 8 VDM and 4 MVM eigen functions may be used for rendering the corresponding VDM data. By this decomposition and compression, the original 68 MB of VDM is reduced to 4 MB.

In summary, a view-dependent displacement representation has been described to model surface mesostructure such as fine-scale shadowing, occlusion and silhouettes. Unlike other forms of displacement mapping, view-dependent displacement mapping represents displacements along the viewing direction instead of a mesh normal direction. A method of rendering high-dimensional texture mesostructures using the view-dependent displacement was also provided that can be implemented on hardware graphics.

Although, the present invention has been described with reference to particular embodiments, workers skilled in the art will recognize that changes may be made in form and detail without departing from the spirit and scope of the invention.

What is claimed is:

1. A computer implemented method for generating a representation of structure for use in rendering a synthesized image, comprising:
   determining distances from a reference surface to the structure at a plurality of points on the reference surface associated with the structure;
   storing a plurality of distances from the reference structure to the structure as a representation, wherein each distance is a function of viewing direction; and
   rendering an image based on the representation.

2. The method of claim 1 wherein the plurality of distances from the reference surface to the structure are performed each for a plurality of viewing directions.

3. The method of claim 2 wherein determining the plurality of distances includes determining distances with respect to a reference surface having a curvature.

4. The method of claim 3 wherein determining the plurality of distances includes calculating distances for a plurality of selected viewing directions uniformly distributed over a selected range and with respect to a reference surface of zero curvature.

5. The method of claim 4 wherein determining the plurality of distances for a reference surface of selected curvature comprises interpolating distances obtained for the reference surface of zero curvature.

6. The method of claim 1 wherein determining distances includes determining if a finite distance exists along the viewing direction, and wherein storing the representation includes storing the finite distances, and if a finite distance to the structure does not exist for a portion of the reference surface, storing an indication in the representation that such a finite, distance does not exist for the portion from the reference surface to the structure along the viewing direction.

7. The method of claim 1 wherein determining the plurality of distances includes determining distances as being substantially parallel to the viewing direction.

8. The method of claim 1 wherein determining the plurality of distances includes determining distances as being a function of an angle of the viewing direction with respect to the preference surface.

9. The method of claim 1 wherein determining the plurality of distances includes determining distances with respect to a reference surface having a curvature.

10. The method of claim 1 wherein storing the representation includes storing distances as a function of coordinates indicative of a point on the reference surface.

11. The method of claim 1 wherein storing the representation includes storing distances as a function of a coordinate of the viewing direction.

12. The method of claim 11 wherein storing the representation includes storing distances as a function of two angular quantities of the viewing direction.

13. The method of claim 1 wherein determining the plurality of distances includes accessing information of height distribution of the structure with zero curvature.

14. The method of claim 1 wherein storing the plurality of distances as a representation includes decomposing the representation as two lower dimensional representations.

15. The method of claim 14 wherein decomposing the representation comprises using a singular value decomposition algorithm.

16. The method of claim 15 wherein determining the plurality of distances includes determining if a finite distance exists along the viewing direction, and wherein storing, the representation includes storing the finite distances, and if a finite distance to the structure from the reference surface does not exist for a portion of the reference surface along the view direction, storing the corresponding distance of a maximum viewing direction having a finite distance.

17. The method of claim 16 and further comprising creating a map to record a maximum viewing direction having a finite distance for each point.

18. The method of claim 17 and further comprising decomposing the map using a singular value decomposition algorithm.

19. A computer implemented method for rendering a synthesized image, comprising:
- establishing a surface geometry of a structure to be synthesized;
- identifying a plurality of points on the surface geometry;
- establishing, for each point of the plurality of points, parameters related to a surface texture to be synthesized at the point, a synthesized viewing direction and a synthesized illumination direction; and
- using a representation of each distances from a reference surface to a sample structure to modify characteristics of each point to render an image based on the modified characteristics, wherein each distances is a function of viewing direction.

20. The method of claim 19 wherein establishing parameters includes establishing a local viewing curvature along the synthesized viewing direction.

21. The method of claim 19 wherein establishing parameters includes establishing a local illumination curvature along the synthesized illumination direction.

22. The method of claim 19 wherein establishing parameters includes interpolating parameters of a second plurality of points based on parameters established for the first-mentioned plurality of points.

23. The method of claim 19 wherein the representation includes finite distances from a reference surface to the, sample structure along the viewing direction, and if a finite distance from the, reference surface to the sample structure does not exist for a portion of the reference surface, an indication that such a finite distance does not exist for the portion from the reference surface to the structure along the viewing direction, and wherein using the representation includes rendering the point if a finite distance exists and not rendering the point if a finite distance does not exist.

24. The method of claim 23 wherein using the representation includes calculating an offset using the corresponding distance of each point along the viewing direction to identify an actual texture coordinate from the reference surface.

25. The method of claim 24 wherein using the representation includes determining if a point is occluded by another portion of the synthesized structure for the synthesized illumination direction.

26. The method of claim 25 wherein using the representation includes modifying characteristics of the point when rendered to include shadowing; if the point is occluded by another portion of the synthesized structure.

* * * * *